(12) United States Patent
Takenouchi et al.

(10) Patent No.: US 12,209,156 B2
(45) Date of Patent: Jan. 28, 2025

(54) PRODUCTION METHOD OF SULFUR-MODIFIED POLYACRYLONITRILE

(71) Applicant: ADEKA CORPORATION, Tokyo (JP)

(72) Inventors: Hiromi Takenouchi, Tokyo (JP); Kensaku Akimoto, Tokyo (JP); Kenji Kakiage, Tokyo (JP); Hirokatsu Shinano, Tokyo (JP); Tomofumi Yokomizo, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 500 days.

(21) Appl. No.: 17/763,839

(22) PCT Filed: Sep. 14, 2020

(86) PCT No.: PCT/JP2020/034674
§ 371 (c)(1),
(2) Date: Mar. 25, 2022

(87) PCT Pub. No.: WO2021/060044
PCT Pub. Date: Apr. 1, 2021

(65) Prior Publication Data
US 2022/0340693 A1  Oct. 27, 2022

(30) Foreign Application Priority Data
Sep. 27, 2019  (JP) .................. 2019-176320

(51) Int. Cl.
*C08F 8/34* (2006.01)
*C08F 20/44* (2006.01)

(52) U.S. Cl.
CPC ............ *C08F 8/34* (2013.01); *C08F 20/44* (2013.01)

(58) Field of Classification Search
CPC .......................................... C08F 8/34
(Continued)

(56) References Cited

U.S. PATENT DOCUMENTS 2,742,346 A * 4/1956 Miller ................. C01B 17/0408
423/576
8,901,251 B2 * 12/2014 He ......................... H01M 4/602
525/329.2

(Continued)

FOREIGN PATENT DOCUMENTS

DE  10 2015 224 204  6/2017
EP  3 279 141  2/2018

(Continued)

OTHER PUBLICATIONS

International Search Report issued Nov. 24, 2020 in International (PCT) Application No. PCT/JP2020/034674.

(Continued)

*Primary Examiner* — Margaret G Moore
(74) *Attorney, Agent, or Firm* — Wenderoth, Lind & Ponack, L.L.P.

(57) ABSTRACT

The present invention provides a method of producing sulfur-modified polyacrylonitrile, including: a step (1) of heating polyacrylonitrile and elemental sulfur in a rotating-type heating container including a discharge pipe and a sulfur vapor recovery unit while rotating the rotating-type heating container; a step (2) of liquefying a sulfur vapor by the sulfur vapor recovery unit while discharging hydrogen sulfide generated in the heating step; and a step (3) of returning the liquefied sulfur to a mixture of the sulfur and the polyacrylonitrile of the step (1).

4 Claims, 3 Drawing Sheets

(58) Field of Classification Search
USPC .............................................. 525/329.1, 343
See application file for complete search history.

(56) References Cited

U.S. PATENT DOCUMENTS

| | | | |
|---|---|---|---|
| 8,940,436 B2* | 1/2015 | Miyuki | .................... C08F 20/44 |
| | | | 429/213 |
| 9,252,425 B2* | 2/2016 | Wegner | ...................... C08F 8/34 |
| 9,484,575 B2* | 11/2016 | Wegner | ................. H01M 4/364 |
| 10,096,834 B2* | 10/2018 | Tenzer | ................ H01M 4/5815 |
| 2011/0200875 A1* | 8/2011 | Miyuki | ...................... C08F 8/34 |
| | | | 429/213 |
| 2014/0008233 A1* | 1/2014 | He | ........................ H01M 4/602 |
| | | | 252/500 |
| 2014/0127589 A1* | 5/2014 | Wegner | ............... H01M 4/1399 |
| | | | 429/337 |
| 2014/0154589 A1* | 6/2014 | Wegner | ..................... C08F 8/34 |
| | | | 252/511 |
| 2015/0129810 A1* | 5/2015 | Tenzer | ................... C08F 120/44 |
| | | | 252/511 |
| 2015/0155560 A1* | 6/2015 | Tenzer | ...................... C08F 8/34 |
| | | | 252/511 |
| 2017/0283524 A1* | 10/2017 | Wang | .................... H01M 4/362 |

FOREIGN PATENT DOCUMENTS

| | | |
|---|---|---|
| JP | 2013-201100 | 10/2013 |
| JP | 2014-22123 | 2/2014 |
| JP | 2014-96327 | 5/2014 |
| WO | 2010/044437 | 4/2010 |
| WO | 2019/141941 | 7/2019 |

OTHER PUBLICATIONS

Extended European Search Report issued Sep. 19, 2023 in corresponding European Patent Application No. 20869875.3.

* cited by examiner

[Fig.1]
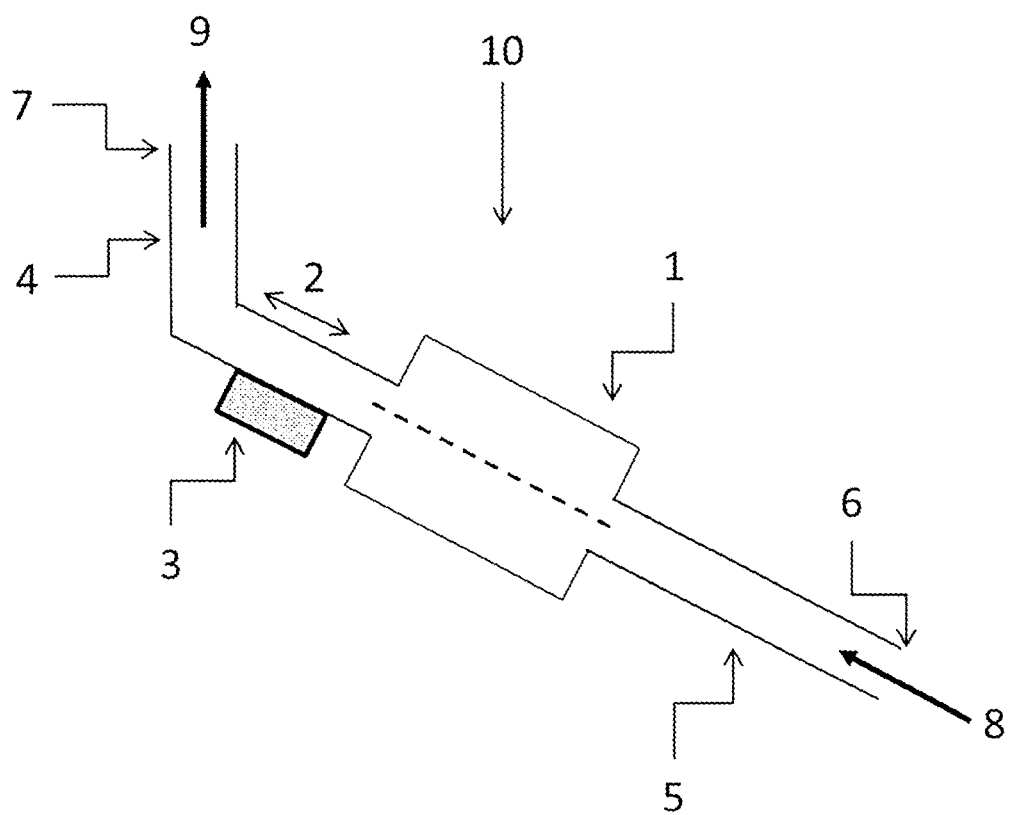

[Fig.2]
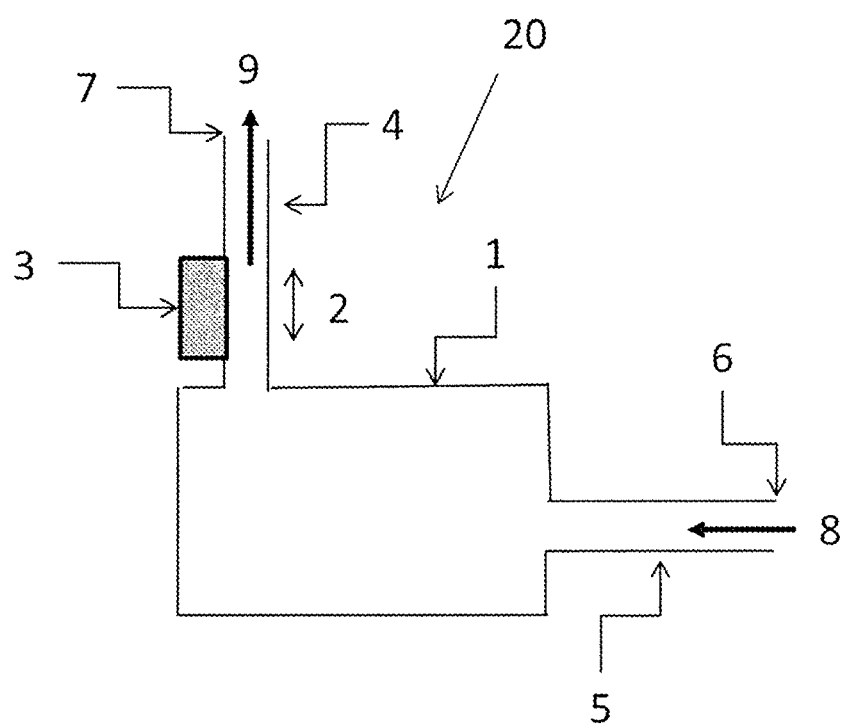

[Fig.3]
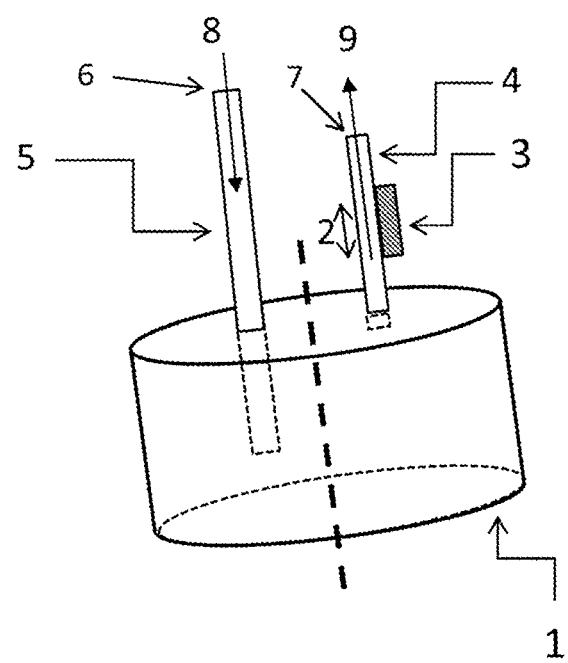

PRODUCTION METHOD OF SULFUR-MODIFIED POLYACRYLONITRILE

TECHNICAL FIELD

The present invention relates to a method of producing sulfur-modified polyacrylonitrile suitably used as an electrode active material for a non-aqueous electrolyte secondary battery.

BACKGROUND ART

A lithium ion secondary battery has been widely used as a power source for a portable electronic device, such as a portable personal computer, a handy video camera, or an information terminal, because the lithium ion secondary battery is compact and lightweight, has a high energy density, has a high capacity, and can be charged and discharged repeatedly. In addition, an electric vehicle using the lithium ion secondary battery, and a hybrid car utilizing electric power in part of its motive power have been put into practical use in view of environmental problems.

Sulfur-modified polyacrylonitrile, which is obtained by subjecting a mixture of polyacrylonitrile and sulfur to heat treatment under a non-oxidizing atmosphere, is known as an electrode active material which has a high charge-discharge capacity and in which the charge-discharge capacity is less reduced along with repetition of charging and discharging (hereinafter sometimes referred to as "cycle characteristics") (see, for example, Patent Literatures 1 to 3). An organosulfur electrode active material has been investigated mainly as an electrode active material of a positive electrode, but has also been investigated as an electrode active material of a negative electrode (see, for example, Patent Literature 3).

As a heating device for producing the sulfur-modified polyacrylonitrile, a pot-type heating container without a stirring mechanism (see, for example, Patent Literatures 1 and 4) and a heating device with a transfer mechanism such as a screw (see, for example, Patent Literature 5) had been proposed. However, it was said that, in an industrially-used moving bed reaction device or ordinary heating reaction container such as a rotary kiln, sulfur rapidly escaped outside a reaction system and could not react sufficiently (see, for example, Patent Literatures 4 and 5).

CITATION LIST

Patent Literature

[PTL 1] WO 2010/044437 A1
[PTL 2] JP 2014-022123 A
[PTL 3] JP 2014-096327 A
[PTL 4] JP 2013-201100 A
[PTL 5] JP 2014-022123 A

SUMMARY OF INVENTION

Technical Problem

In the secondary battery field, an ability to perform charging and discharging at a large current is referred to as "rate characteristics". In a lithium ion secondary battery to be used for an automobile, discharging at a large current is required at the time of starting and acceleration, and a secondary battery excellent in rate characteristics is required. The sulfur-modified polyacrylonitrile may cause a reduction in charge-discharge capacity after repetition of discharging at a large current, and there is an issue in that an improvement in rate characteristics is required.

Solution to Problem

The inventors of the present invention made extensive investigations on the above-mentioned issue, and as a result, found that, when sulfur-modified polyacrylonitrile produced by continuously recovering and reusing a sulfur vapor generated by heating sulfur and polyacrylonitrile in a rotating-type heating container is used as an electrode active material, a lithium ion secondary battery excellent in rate characteristics is obtained. Thus, the inventors completed the present invention.

That is, according to one embodiment of the present invention, there is provided a method of producing sulfur-modified polyacrylonitrile, comprising: a step (1) of heating polyacrylonitrile and sulfur in a rotating-type heating container comprising a discharge pipe and a sulfur vapor recovery unit while rotating the rotating-type heating container; a step (2) of liquefying a sulfur vapor by the sulfur vapor recovery unit while discharging hydrogen sulfide generated in the heating step; and a step (3) of returning the liquefied sulfur to a mixture of the sulfur and the polyacrylonitrile of the step (1).

Advantageous Effects of Invention

When the sulfur-modified polyacrylonitrile obtained by the production method of the present invention is used as an electrode active material, a non-aqueous electrolyte secondary battery excellent in rate characteristics can be provided. In addition, even when the usage amount of a binder is reduced, the sulfur-modified polyacrylonitrile produced in the rotating-type heating container can form an electrode active material mixture layer, and can thus increase a charge-discharge capacity per unit volume of an electrode.

BRIEF DESCRIPTION OF DRAWINGS

FIG. 1 is a view for illustrating one embodiment of a rotating-type heating container to be used in the present invention.

FIG. 2 is a view for illustrating another embodiment of the rotating-type heating container to be used in the present invention.

FIG. 3 is a view for illustrating still another embodiment of the rotating-type heating container to be used in the present invention.

DESCRIPTION OF EMBODIMENTS

In the present invention, sulfur-modified polyacrylonitrile is a compound obtained by subjecting polyacrylonitrile and elemental sulfur to heat treatment in a non-oxidizing atmosphere. Polyacrylonitrile may be a homopolymer of acrylonitrile, or may be a copolymer of acrylonitrile and different monomer(s). In the case where polyacrylonitrile is the copolymer, battery performance is reduced when the content of acrylonitrile is reduced. Accordingly, the content of acrylonitrile in the copolymer is preferably at least 90 mass % or more. Examples of the different monomer(s) include acrylic acid, vinyl acetate, N-vinyl formamide, and N,N'-methylenebis(acrylamide).

The weight average molecular weight of polyacrylonitrile to be used in the present invention is not particularly limited, and commercially available polyacrylonitrile may be used.

The blending ratio between polyacrylonitrile and elemental sulfur is as follows: preferably 100 parts by mass to 1,500 parts by mass, more preferably 150 parts by mass to 1,000 parts by mass of elemental sulfur with respect to 100 parts by mass of polyacrylonitrile. Polyacrylonitrile and elemental sulfur are each preferably formed of powder because uniform modification with sulfur is achieved. When the particle diameters of polyacrylonitrile and elemental sulfur are too small, it requires great labor to reduce polyacrylonitrile and elemental sulfur to fine particle diameters. When the particle diameters of polyacrylonitrile and elemental sulfur are too large, modification with sulfur becomes insufficient. Accordingly, the particle diameters of polyacrylonitrile and elemental sulfur are each preferably from 1 μm to 1,000 μm in terms of an average particle diameter.

A temperature of the heat treatment in the heat treatment step (step (1)) is preferably from 250° C. to 550° C., more preferably from 350° C. to 450° C. The heat treatment is performed under a non-oxidizing atmosphere. The non-oxidizing atmosphere may be an atmosphere in which a gas phase has an oxygen concentration of 5 vol % or less, preferably 2 vol % or less, more preferably an atmosphere substantially free of oxygen, for example, an inert gas atmosphere of nitrogen, helium, argon, or the like, or a sulfur gas atmosphere.

In the heat treatment step (step (1)), it is preferred that polyacrylonitrile and elemental sulfur, or an intermediate of the sulfur-modified polyacrylonitrile and sulfur be heated while being mixed with each other so that uniform modification with sulfur is achieved. A production method of the present invention is characterized in using, as a heating container for heating polyacrylonitrile and sulfur, a rotating-type heating container having a mechanism for condensing (recovering) and returning a sulfur vapor. In the present invention, the "rotating-type heating container" refers to a heating container in which the container undergoes rotational movement in itself and contents thereof are mixed with each other by their own weights. The rotating-type heating container has a cylindrical shape or a combination structure of cylindrical shapes, and examples of the rotating-type heating container include: a drum-type heating container in which a cylindrical-shaped container is rotated; a V-type heating container having a shape in which cylindrical shapes are combined in a V shape; a W-type heating container having a structure in which a short cylinder is sandwiched between two circular truncated cones; and a rotary kiln. In each of the drum-type heating container, the V-type heating container, and the W-type heating container, a rotation axis thereof is an axis intersecting with a center axis of a cylinder. In the rotary kiln, a rotation axis thereof is a center axis of a cylinder.

In the heat treatment step (step (1)), hydrogen sulfide and the sulfur vapor are generated. The rotating-type heating container to be used in the present invention comprises a discharge pipe for discharging hydrogen sulfide, and the discharge pipe has a mechanism for condensing the sulfur vapor contained in a discharge gas and returning the resultant sulfur to the rotating-type heating container. Sulfur has a high vapor pressure, and hence the sulfur vapor is discharged together with hydrogen sulfide in the heat treatment step even when the temperature of the heat treatment is equal to or lower than the boiling point of sulfur, which may cause lack of sulfur in the heating container. However, in the present invention, a reaction can be completed by recovering and reusing sulfur.

The mechanism for condensing the sulfur vapor contained in the discharge gas and returning the resultant sulfur to the rotating-type heating container is not particularly limited as long as the mechanism can return sulfur to the rotating-type heating container without blockage of the discharge pipe by solidified sulfur. For example, it is appropriate to form a zone for condensing and liquefying the sulfur vapor in a portion of the discharge pipe closer to the rotating-type heating container and return liquefied sulfur to the heating container. A temperature of the zone of the discharge pipe is preferably a temperature slightly higher than the melting point of sulfur, for example, from about 120° C. to about 150° C.

Specific embodiments of the present invention are described with reference to the drawings of the rotating-type heating container having the mechanism for condensing (recovering) and returning the sulfur vapor.

FIG. 1 is a view for illustrating one embodiment of the rotating-type heating container to be used in the present invention. A rotating-type heating container 10 comprises a rotating-type heating unit 1, a sulfur recovery unit 2, a temperature controller 3, a discharge pipe 4, and a gas introduction pipe 5. In this embodiment, the rotating-type heating unit 1 is inclined by a predetermined angle with respect to the horizontal, and rotates about the broken line of FIG. 1 as a center axis.

Sulfur and polyacrylonitrile are each introduced into the rotating-type heating unit 1. Sulfur and polyacrylonitrile may be introduced thereinto separately or in the state of a mixture obtained by mixing them in advance.

Sulfur and polyacrylonitrile are heated while the rotating-type heating unit 1 is rotated. During the heating, an inert gas, such as nitrogen, helium, or argon, is introduced in a direction shown by an arrow 8 from a gas introduction port 6. Polyacrylonitrile and elemental sulfur, or an intermediate of the sulfur-modified polyacrylonitrile and sulfur are mixed with each other on a side surface of a cylinder.

Hydrogen sulfide and the sulfur vapor are generated from sulfur and polyacrylonitrile heated and mixed with each other. Hydrogen sulfide and the sulfur vapor are introduced together with the inert gas into the sulfur recovery unit 2 connected to the rotating-type heating unit 1 and the discharge pipe 4.

A rotation speed of the rotating-type heating container during the mixing of sulfur and polyacrylonitrile may be appropriately controlled depending on the kind, scale, and the like of a device without particular limitations. However, the mixing may be specifically performed at a rotation speed of generally from 0.05 rotation per minute to 20 rotations per minute, preferably from 0.1 rotation per minute to 10 rotations per minute, more preferably from 0.2 rotation per minute to 5 rotations per minute.

The sulfur recovery unit 2 may be positioned so as to be connected to any portion of the rotating-type heating unit 1, but as illustrated in FIG. 1, is preferably positioned at a higher position with respect to the rotating-type heating unit 1.

The sulfur recovery unit 2 is controlled by the temperature controller 3 to a temperature slightly higher than the melting point of sulfur, for example, from about 120° C. to about 150° C. The sulfur recovery unit 2 may be part of the discharge pipe 4. It is appropriate to arrange the temperature controller 3 in the discharge pipe 4 to form a portion in which a temperature can be controlled to a sulfur recoverable temperature region (e.g., from 120° C. to 150° C.) and use the portion as the sulfur recovery unit 2.

Herein, only the sulfur vapor is condensed to a liquid, and sulfur is recovered. Hydrogen sulfide has a boiling point of about −60° C., and is hence transferred in the state of a gas in a direction shown by an arrow 9 from a discharge port 7 of the discharge pipe 4.

After liquid sulfur is recovered by the sulfur recovery unit 2, the sulfur is returned to a mixture of sulfur and polyacrylonitrile under heating. In the case of FIG. 1, the sulfur recovery unit 2 is positioned at a higher position with respect to the rotating-type heating unit 1, and hence liquid sulfur reaches the mixture of sulfur and polyacrylonitrile by gravity.

Accordingly, when the rotating-type heating container 10 having the structure of FIG. 1 is used, the heating and mixing of sulfur and polyacrylonitrile, and the recovery and returning of the sulfur vapor can be performed continuously.

FIG. 2 is a view for illustrating another embodiment. In a rotating-type heating container 20, the rotating-type heating unit 1 is arranged horizontally, and the discharge pipe 4 is vertically arranged to a portion of an upper portion of the rotating-type heating unit 1.

Other configurations are the same as in the case of using the rotating-type heating container 10 of FIG. 1.

FIG. 3 is a view for illustrating still another embodiment. In this embodiment, the rotating-type heating unit 1 is inclined by a predetermined angle with respect to the vertical, and rotates about the broken line of FIG. 3 as a center axis. The discharge pipe 4 is vertically arranged to a portion of an upper portion of the rotating-type heating unit 1.

Polyacrylonitrile and elemental sulfur, or an intermediate of the sulfur-modified polyacrylonitrile and sulfur are mixed with each other on a bottom surface of a cylinder.

Other configurations are the same as in the case of using the rotating-type heating container 10 of FIG. 1.

The sulfur-modified polyacrylonitrile obtained through the heat treatment may contain free sulfur (elemental sulfur), which adversely affects the battery performance, and hence the production method preferably includes a desulfurization step of removing free sulfur from the sulfur-modified polyacrylonitrile obtained through the steps (1) to (3) of the present invention. A method for the desulfurization is exemplified by a heating method and a solvent washing method. When the content of sulfur in the sulfur-modified polyacrylonitrile is small, a sufficient charge-discharge capacity may not be obtained, and when the content of sulfur in the sulfur-modified polyacrylonitrile is large, excellent cycle characteristics may not be obtained. Accordingly, the content of sulfur in the sulfur-modified polyacrylonitrile is preferably from 30 mass % to 50 mass %, more preferably from 35 mass % to 45 mass %. The content of sulfur in an organosulfur electrode active material may be calculated from analysis results using a CHN analyzer capable of analyzing sulfur and oxygen.

The sulfur-modified polyacrylonitrile obtained by the production method of the present invention preferably has a particle diameter of from 0.1 μm to 50 μm in terms of an average particle diameter. The particle diameter is a diameter on a volume basis, and the diameters of secondary particles are measured by a laser diffraction light scattering method. In the present invention, the "average particle diameter" refers to a 50% particle diameter (D50) measured by a laser diffraction light scattering method. It requires great labor to reduce the average particle diameter of the sulfur-modified polyacrylonitrile to less than 0.1 μm, but a further improvement in battery performance cannot be expected. When the average particle diameter of the sulfur-modified polyacrylonitrile is more than 50 μm, peeling or the like of an electrode mixture layer may be liable to occur. The sulfur-modified polyacrylonitrile of the present invention has an average particle diameter of more preferably from 0.5 μm to 30 μm, still more preferably from 1 μm to 20 μm.

In the pulverization of the sulfur-modified polyacrylonitrile, a known pulverizer may be used, and examples of the known pulverizer include: medium stirring mills, such as a sand mill, an attritor, and a bead mill; container-drive type mills each using a ball or a rod as a medium, such as a rotation mill, a vibration mill, and a planetary mill; and a jet mill, a roll mill, a hammer mill, a pin mill, and a cyclone mill.

When the sulfur-modified polyacrylonitrile obtained by the present invention is used as an electrode active material, a non-aqueous electrolyte secondary battery excellent in rate characteristics can be provided. In addition, even when the usage amount of a binder is reduced, an electrode active material mixture layer can be formed, and thus a charge-discharge capacity per unit volume of an electrode can be increased. This is presumably because the rotating-type heating container is excellent in mixing efficiency, and can achieve uniform modification with sulfur as compared to the case of using a stirring blade or a screw.

The sulfur-modified polyacrylonitrile of the present invention can be suitably used as an electrode active material of an electrode for a non-aqueous electrolyte secondary battery. Specifically, the sulfur-modified polyacrylonitrile of the present invention is provided on a current collector to form an electrode mixture layer containing the sulfur-modified polyacrylonitrile. The electrode mixture layer is formed by applying a slurry prepared by adding the sulfur-modified polyacrylonitrile of the present invention, a binder, and a conductive assistant to a solvent onto the current collector, followed by drying.

A binder known as a binder for an electrode may be used as the binder, and examples thereof include a styrene-butadiene rubber, a butadiene rubber, polyethylene, polypropylene, polyamide, polyamide imide, polyimide, polyacrylonitrile, polyurethane, polyvinylidene fluoride, polytetrafluoroethylene, an ethylene-propylene-diene rubber, a fluorine rubber, a styrene-acrylic acid ester copolymer, an ethylene-vinyl alcohol copolymer, an acrylonitrile butadiene rubber, a styrene-isoprene rubber, polymethyl methacrylate, polyacrylate, polyvinyl alcohol, polyvinyl ether, carboxymethyl cellulose, sodium carboxymethyl cellulose, methyl cellulose, a cellulose nanofiber, polyethylene oxide, starch, polyvinylpyrrolidone, polyvinyl chloride, and polyacrylic acid.

As the binder, an aqueous binder is preferred because of its low environmental load and excellent binding strength, and a styrene-butadiene rubber, sodium carboxymethyl cellulose, and polyacrylic acid are more preferred. Those binders may be used alone or in combination thereof. The content of the binder in the slurry is preferably from 0.05 part by mass to 30 parts by mass, more preferably from 0.1 part by mass to 20 parts by mass with respect to 100 parts by mass of the sulfur-modified polyacrylonitrile of the present invention.

A conductive assistant known as a conductive assistant for an electrode may be used as the conductive assistant, and specific examples thereof include: carbon materials, such as natural graphite, artificial graphite, carbon black, ketjen black, acetylene black, channel black, furnace black, lamp black, thermal black, a carbon nanotube, a vapor grown carbon fiber (VGCF), flake graphite, exfoliated graphite, graphene, fullerene, and needle coke; metal powders, such as aluminum powder, nickel powder, and titanium powder; conductive metal oxides, such as zinc oxide and titanium oxide; and sulfides, such as $La_2S_3$, $Sm_2S_3$, $Ce_2S_3$, and $TiS_2$. The particle diameter of the conductive assistant is preferably from 0.0001 μm to 100 μm, more preferably from 0.01 μm to 50 μm in terms of an average particle diameter. The content of the conductive assistant in the slurry is generally from 0.1 part by mass to 50 parts by mass, preferably from 1 part by mass to 30 parts by mass, more preferably from 2 parts by mass to 20 parts by mass with respect to 100 parts by mass of the sulfur-modified polyacrylonitrile of the present invention.

Examples of the solvent for preparing the slurry to be used in the present invention include propylene carbonate, ethylene carbonate, diethyl carbonate, dimethyl carbonate, ethylmethyl carbonate, 1,2-dimethoxyethane, 1,2-diethoxyethane, acetonitrile, propionitrile, tetrahydrofuran, 2-methyltetrahydrofuran, dioxane, 1,3-dioxolane, nitromethane, N-methylpyrrolidone, N,N-dimethylformamide, dimethylacetamide, methyl ethyl ketone, cyclohexanone, methyl acetate, methyl acrylate, diethyltriamine, N,N-dimethylaminopropylamine, polyethylene oxide, tetrahydrofuran, dimethyl sulfoxide, sulfolane, γ-butyrolactone, water, and an alcohol. The usage amount of the solvent may be adjusted in accordance with a method of applying the slurry. For example, in the case of a doctor blade method, the usage amount is preferably from 20 parts by mass to 300 parts by mass, more preferably from 30 parts by mass to 200 parts by mass with respect to 100 parts by mass of a total amount of the sulfur-modified polyacrylonitrile, the binder, and the conductive assistant.

The slurry may contain different component(s) in addition to the above-mentioned components. Examples of the other component include a viscosity modifier, a reinforcing material, and an antioxidant.

A method of preparing the slurry is not particularly limited, but for example, an ordinary ball mill, a sand mill, a bead mill, a pigment disperser, a mortar machine, an ultrasonic disperser, a homogenizer, a rotation/revolution mixer, a planetary mixer, Fill Mix, Jet Paster, or the like may be used.

A conductive material, such as titanium, a titanium alloy, aluminum, an aluminum alloy, copper, nickel, stainless steel, or nickel-plated steel, is used as the current collector. The surfaces of those conductive materials may each be coated with carbon. The current collector has a foil shape, a sheet shape, a mesh shape, or the like. Of those options, aluminum is preferred from the viewpoints of conductivity and cost, and a foil shape is preferred out of the shapes. In the case of a foil shape, a foil thickness is generally from 1 μm to 100 μm.

The method of applying the slurry onto the current collector is not particularly limited, and various methods, such as a die coater method, a comma coater method, a curtain coater method, a spray coater method, a gravure coater method, a flexo coater method, a knife coater method, a doctor blade method, a reverse roll method, a brush coating method, and a dip method, may each be used. Of those, a die coater method, a doctor blade method, and a knife coater method are preferred because these methods can each be adjusted to the physical properties such as a viscosity and the drying property of the slurry to obtain an application layer with a satisfactory surface state. The slurry may be applied onto only one surface or both surfaces of the current collector. When the slurry is applied onto both surfaces of the current collector, the slurry may be applied sequentially onto one surface at a time, or may be applied simultaneously onto both surfaces at a time. In addition, the slurry may be applied onto the surface of the current collector continuously or intermittently, or may be applied thereonto in, for example, a stripe pattern. The thickness, the length, and the width of the application layer may be appropriately determined depending on the size of a battery.

A method of drying the slurry having been applied onto the current collector is not particularly limited, and various methods, such as drying with warm air, hot air, or low-humidity air, vacuum drying, still standing in a heating furnace or the like, irradiation with far infrared rays, infrared rays, electron beams, or the like, may each be used. With the drying, a volatile component such as the solvent volatilizes from the application film of the slurry, and thus the electrode mixture layer is formed on the current collector. After that, the electrode may be subjected to press processing as required.

An electrode of the present invention can be used for, without particular limitations, a non-aqueous power storage device comprising a non-aqueous electrolyte. Examples of the power storage device include a primary battery, a secondary battery, an electric double layer capacitor, and a lithium ion capacitor. The non-aqueous electrolyte may be any one of a liquid electrolyte, a gel electrolyte, a solid electrolyte, and the like. The electrode of the present invention can be suitably used for a non-aqueous electrolyte secondary battery, and can be more suitably used for a lithium ion secondary battery. The electrode of the present invention can be used as a positive electrode or a negative electrode of the power storage device.

In general, the non-aqueous electrolyte secondary battery comprises a positive electrode, a negative electrode, and a non-aqueous electrolyte. When the electrode of the present invention is used as the positive electrode, an electrode comprising a known negative electrode active material may be used as the negative electrode. When the electrode of the present invention is used as the negative electrode, an electrode comprising a known positive electrode active material may be used as the positive electrode. A negative electrode in the case of using the electrode of the present invention as the positive electrode, and a positive electrode in the case of using the electrode of the present invention as the negative electrode are each referred to as "counter electrode".

Examples of the known negative electrode active material, which is used when the electrode comprising the sulfur-modified polyacrylonitrile of the present invention as the electrode active material is used as a positive electrode, and the counter electrode is a negative electrode, include, in the case of a lithium ion secondary battery, natural graphite, artificial graphite, non-graphitizable carbon, graphitizable carbon, lithium, a lithium alloy, silicon, a silicon alloy, silicon oxide, tin, a tin alloy, tin oxide, phosphorus, germanium, indium, copper oxide, antimony sulfide, titanium oxide, iron oxide, manganese oxide, cobalt oxide, nickel oxide, lead oxide, ruthenium oxide, tungsten oxide, and zinc oxide, and as well, composite oxides, such as $LiVO_2$, $Li_2VO_4$, and $Li_4Ti_5O_{12}$. Those negative electrode active materials may be used alone or in combination thereof.

In the case of a sodium ion secondary battery, the negative electrode active material free of a lithium atom or the negative electrode active material in which a lithium atom is replaced with a sodium atom among the above-mentioned negative electrode active materials in the case of a lithium ion secondary battery may be used. When the negative electrode active material is lithium or a lithium alloy, or sodium or a sodium alloy, the negative electrode active material in itself may be used as an electrode without use of the current collector.

Examples of the known positive electrode active material, which is used when the electrode comprising the sulfur-modified polyacrylonitrile of the present invention as the electrode active material is used as a negative electrode, and the counter electrode is a positive electrode, include a composite oxide of lithium and a transition metal, a lithium-containing transition metal phosphate compound, and a lithium-containing silicate compound. A transition metal in the composite oxide of lithium and a transition metal is preferably, for example, vanadium, titanium, chromium, manganese, iron, cobalt, nickel, or copper. Specific examples of the composite oxide of lithium and a transition metal include: composite oxides of lithium and cobalt, such as $LiCoO_2$; composite oxides of lithium and nickel, such as $LiNiO_2$; composite oxides of lithium and manganese, such as $LiMnO_2$, $LiMn_2O_4$, and $Li_2MnO_3$; and compounds obtained by substituting part of primary transition metal atoms of these composite oxides of lithium and transition metals with another metal, such as aluminum, titanium, vanadium, chromium, manganese, iron, cobalt, lithium, nickel, copper, zinc, magnesium, gallium, or zirconium. Specific examples of the substituted compounds include $Li_{1.1}Mn_{1.8}Mg_{0.1}O_4$, $Li_{1.1}Mn_{1.85}Al_{0.05}O_4$, $LiNi_{0.80}Co_{0.2}Mn_{0.3}O_2$, $LiNi_{0.80}Co_{0.15}Mn_{0.1}O_2$, $LiNi_{0.5}Mn_{0.5}O_2$, $LiNi_{0.80}Co_{0.17}Al_{0.03}O_2$, $LiNi_{0.80}Co_{0.15}Al_{0.05}O_2$, $LiNi_{1/3}Co_{1/3}Mn_{1/3}O_2$, $LiNi_{0.6}Co_{0.2}Mn_{0.2}O_2$, $LiMn_{1.3}Al_{0.2}O_4$, $LiMn_{1.5}Ni_{0.5}O_4$, and $Li_2MnO_3$—$LiMO_2$ (M=Co, Ni, or Mn). A transition metal in the lithium-containing transition metal phosphate compound is preferably vanadium, titanium, manganese, iron, cobalt, nickel, or the like, and specific examples of the compound include: iron phosphate compounds, such as $LiFePO_4$ and $LiMn_xFe_{1-x}PO_4$; cobalt phosphate compounds, such as $LiCoPO_4$; compounds obtained by substituting part of primary transition metal atoms of these lithium-containing transition metal phosphate compounds with another metal, such as aluminum, titanium, vanadium, chromium, manganese, iron, cobalt, nickel, copper, zinc, magnesium, gallium, zirconium, or niobium; and vanadium phosphate compounds, such as $Li_3V_2(PO_4)_3$. An example of the lithium-containing silicate compound is $Li_2FeSiO_4$. Those compounds may be used alone or in combination thereof.

The counter electrode may be produced by replacing the above-mentioned sulfur-modified polyacrylonitrile of the present invention with the above-mentioned known negative electrode active material or known positive electrode active material.

As a non-aqueous electrolyte of the non-aqueous electrolyte secondary battery of the present invention, there are given, for example: a liquid electrolyte obtained by dissolving a supporting electrolyte in an organic solvent; a gel polymer electrolyte in which a supporting electrolyte is dissolved in an organic solvent and gelation is performed with a polymer; a pure polymer electrolyte which is free of an organic solvent and in which a supporting electrolyte is dispersed in a polymer; a hydride-based solid electrolyte; and an inorganic solid electrolyte.

In the case of the lithium ion secondary battery, for example, a hitherto known lithium salt is used as the supporting electrolyte to be used in the liquid electrolyte and the gel polymer electrolyte. Examples thereof include $LiPF_6$, $LiBF_4$, $LiAsF_6$, $LiCF_3SO_3$, $LiCF_3CO_2$, $LiN(CF_3SO_2)_2$, $LiN(C_2F_5SO_2)_2$, $LiN(SO_2F)_2$, $LiC(CF_3SO_2)_3$, $LiB(CF_3SO_3)_4$, $LiB(C_2O_4)_2$, $LiBF_2(C_2O_4)$, $LiSbF_6$, $LiSiF_5$, $LiSCN$, $LiClO_4$, $LiCl$, $LiF$, $LiBr$, $LiI$, $LiAlF_4$, $LiAlCl_4$, $LiPO_2F_2$, and derivatives thereof. Of those, one or more kinds selected from the group consisting of $LiPF_6$, $LiBF_4$, $LiClO_4$, $LiAsF_6$, $LiCF_3SO_3$ or derivatives thereof, $LiN(CF_3SO_2)_2$, $LiN(C_2F_5SO_2)_2$, $LiN(SO_2F)_2$, and $LiC(CF_3SO_2)_3$ or derivatives thereof are preferably used. The content of the supporting electrolyte in the liquid electrolyte or the gel polymer electrolyte is preferably from 0.5 mol/L to 7 mol/L, more preferably from 0.8 mol/L to 1.8 mol/L.

Examples of the supporting electrolyte to be used in the pure polymer electrolyte include, in the case of the lithium ion secondary battery, $LiN(CF_3SO_2)_2$, $LiN(C_2F_5SO_2)_2$, $LiN(SO_2F)_2$, $LiC(CF_3SO_2)_3$, $LiB(CF_3SO_3)_4$, and $LiB(C_2O_4)_2$.

Examples of the hydride-based solid electrolyte include $LiBH_4$, $LiBH_4$—$LiI$, $LiBH_4$—$P_2S_5$, $LiAlH_4$, and $Li_3AlH_6$.

Examples of the inorganic solid electrolyte include, in the case of the lithium ion secondary battery: phosphoric acid-based materials, such as $Li_{1+x}A_xB_{2-x}(PO_4)_3$ (A=Al, Ge, Sn, Hf, Zr, Sc, or Y, B=Ti, Ge, or Zn, 0<x<0.5), $LiMPO_4$ (M=Mn, Fe, Co, or Ni), and $Li_3PO_4$; composite oxides of lithium, such as $Li_3XO_4$ (X=As or V), $Li_{3+x}A_xB_{1-x}O_4$ (A=Si, Ge, or Ti, B=P, As, or V, 0<x<0.6), $Li_{4+x}A_xSi_{1-x}O_4$ (A=B, Al, Ga, Cr, or Fe, 0<x<0.4) (A=Ni or Co, 0<x<0.1), $Li_{4-3y}Al_ySiO_4$ (0<y<0.06), $Li_{4-2y}Zn_yGeO_4$ (0<y<0.25), $LiAlO_2$, $Li_2BO_4$, $Li_4XO_4$ (X=Si, Ge, or Ti), and lithium titanate ($LiTiO_2$, $LiTi_2O_4$, $Li_4TiO_4$, $Li_2TiO_3$, $Li_2Ti_3O_7$, or $Li_4Ti_5O_{12}$); compounds each containing lithium and a halogen atom, such as $LiBr$, $LiF$, $LiCl$, $LiPF_6$, and $LiBF_4$; compounds each containing lithium and a nitrogen atom, such as $LiPON$, $LiN(SO_2CF_3)_2$, $LiN(SO_2C_2F_5)_2$, $Li_3N$, and $LiN(SO_2C_3F_7)_2$; crystals each having a perovskite structure having lithium ion conductivity, such as $La_{0.55}Li_{0.35}TiO_3$; crystals each having a garnet-type structure, such as $Li_7$—$La_3Zr_2O_{13}$; glasses, such as $50Li_4SiO_4.50Li_3BO_{33}$ and $90Li_3BO_3.10Li_2SO_4$; lithium-phosphorus sulfide-based crystals, such as $70Li_2S·30P_2S_5$, $75Li_2S·25P_2S_5$, $Li_6PS_5Cl$, $Li_{9.54}Si_{1.74}P_{1.44}S_{11.7}Cl_{0.3}$, $Li_6PS_5P_{1.44}Cl_3$, $Li_{10}GeP_2S_{12}$, and $Li_{3.25}Ge_{0.25}P_{0.75}S_4$; lithium-phosphorus sulfide-based glasses, such as $30Li_2S·26B_2S_3.44LiI$, $50Li_2S·17P_2S_5·33LiBH$, $50Li_2S·50GeS_2$, $63Li_2S·36SiS_2·1Li_3PO_4$, $57Li_2S·38SiS_2.5Li_4SiO_4$, and $70Li_2S·50GeS_2$; and glass ceramics, such as $Li_7P_3S_{11}$, $Li_{3.25}P_{0.95}S_4$, $Li_{10}GeP_2S_{12}$, $Li_{9.6}P_3S_{12}$, and $Li_{9.54}Si_{1.74}P_{1.44}S_{11.7}Cl_{0.3}$. The inorganic solid electrolyte may be coated with the gel polymer electrolyte. In addition, when the inorganic solid electrolyte is used, a layer of the gel polymer electrolyte may be arranged between a layer of the inorganic solid electrolyte and an electrode.

In the case of a sodium ion secondary battery, the supporting electrolyte in which a lithium atom is replaced with a sodium atom among the above-mentioned supporting electrolytes in the case of a lithium ion secondary battery may be used.

As the organic solvent to be used for preparation of the liquid electrolyte to be used in the present invention, organic solvents generally used for the liquid electrolyte may be used alone or in combination thereof. Specific examples thereof include a saturated cyclic carbonate compound, a saturated cyclic ester compound, a sulfoxide compound, a sulfone compound, an amide compound, a saturated chain carbonate compound, a chain ether compound, a cyclic ether compound, and a saturated chain ester compound.

Of those organic solvents, the saturated cyclic carbonate compound, the saturated cyclic ester compound, the sulfoxide compound, the sulfone compound, and the amide compound each play a role in increasing the dielectric constant of the liquid electrolyte by virtue of having a high specific dielectric constant, and the saturated cyclic carbonate compound is particularly preferred. Examples of such saturated cyclic carbonate compound include ethylene carbonate, 1,2- propylene carbonate, 1,3-propylene carbonate, 1,2-butylene carbonate, 1,3-butylene carbonate, and 1,1-dimethylethylene carbonate. Examples of the saturated cyclic ester compound include γ-butyrolactone, γ-valerolactone, γ-caprolactone, 5-hexanolactone, and 5-octanolactone. Examples of the sulfoxide compound include dimethyl sulfoxide, diethyl sulfoxide, dipropyl sulfoxide, diphenyl sulfoxide, and thiophene. Examples of the sulfone compound include dimethylsulfone, diethylsulfone, dipropylsulfone, diphenylsulfone, sulfolane (also referred as tetramethylene sulfone), 3-methylsulfolane, 3,4-dimethylsulfolane, 3,4-diphenymethylsulfolane, sulfolene, 3-methylsulfolene, 3-ethylsulfolene, and 3-bromomethylsulfolene. Of those, sulfolane and tetramethylsulfolane are preferred. Examples of the amide compound include N-methylpyrrolidone, dimethylformamide, and dimethylacetamide.

Of the above-mentioned organic solvents, the saturated chain carbonate compound, the chain ether compound, the cyclic ether compound, and the saturated chain ester compound can each make battery characteristics, such as an output density, excellent by virtue of having the capability of reducing the viscosity of the liquid electrolyte, the capability of increasing the mobility of an electrolyte ion, and the like. In addition, the saturated chain carbonate compound is particularly preferred because the compound has a low viscosity, and can improve the performance of the liquid electrolyte at low temperature. Examples of the saturated chain carbonate compound include dimethyl carbonate, ethyl methyl carbonate, diethyl carbonate, ethyl butyl carbonate, methyl-t-butyl carbonate, diisopropyl carbonate, and t-butyl propyl carbonate. Examples of the chain ether compound or the cyclic ether compound include dimethoxyethane, ethoxymethoxyethane, diethoxyethane, tetrahydrofuran, dioxolane, dioxane, 1,2-bis(methoxycarbonyloxy)ethane, 1,2-bis(ethoxycarbonyloxy)ethane, 1,2-bis(ethoxycarbonyloxy)propane, ethylene glycol bis(trifluoroethyl)ether, propylene glycol bis(trifluoroethyl)ether, ethylene glycol bis(trifluoromethyl)ether, and diethylene glycol bis(trifluoroethyl)ether. Of those, dioxolane is preferred.

The saturated chain ester compound is preferably a monoester compound or a diester compound having 2 to 8 carbon atoms in total in a molecule thereof. Specific examples of the compound include methyl formate, ethyl formate, methyl acetate, ethyl acetate, propyl acetate, isobutyl acetate, butyl acetate, methyl propionate, ethyl propionate, methyl butyrate, methyl isobutyrate, methyl trimethylacetate, ethyl trimethylacetate, methyl malonate, ethyl malonate, methyl succinate, ethyl succinate, methyl 3-methoxypropionate, ethyl 3-methoxypropionate, ethylene glycol diacetyl, and propylene glycol diacetyl. Of those, methyl formate, ethyl formate, methyl acetate, ethyl acetate, propyl acetate, isobutyl acetate, butyl acetate, methyl propionate, and ethyl propionate are preferred.

Other than the foregoing, for example, acetonitrile, propionitrile, nitromethane, derivatives thereof, and various ionic liquids may each also be used as the organic solvent used for preparation of the liquid electrolyte.

Examples of the polymer to be used in the gel polymer electrolyte include polyethylene oxide, polypropylene oxide, polyvinyl chloride, polyacrylonitrile, polymethyl methacrylate, polyethylene, polyvinylidene fluoride, and polyhexafluoropropylene. Examples of the polymer to be used in the pure polymer electrolyte include polyethylene oxide, polypropylene oxide, and polystyrenesulfonic acid. The blending ratio in the polymer gel electrolyte and a compositing method are not particularly limited, and a known blending ratio and a known compositing method in the technical field may be adopted.

In order to prolong the lifetime of the battery and improve the safety thereof, the non-aqueous electrolyte may further contain a known additive, such as an electrode film forming agent, an antioxidant, a flame retardant, or an overcharge inhibitor. When the additive is used, the amount of the additive is generally from 0.01 part by mass to 10 parts by mass, preferably from 0.1 part by mass to 5 parts by mass with respect to the entirety of the non-aqueous electrolyte.

The non-aqueous electrolyte secondary battery to which the present invention can be applied may comprise a separator between the positive electrode and the negative electrode. A microporous polymer film generally used for the non-aqueous electrolyte secondary battery may be used as the separator without no particular limitations. Examples of the film include films consisting of polymer compounds containing, as main components, for example, any of polyethylene, polypropylene, polyvinylidene fluoride, polyvinylidene chloride, polyacrylonitrile, polyacrylamide, polytetrafluoroethylene, polysulfone, polyethersulfone, polycarbonate, polyamide, polyimide, polyethers, such as polyethylene oxide and polypropylene oxide, various celluloses, such as carboxymethyl cellulose and hydroxypropyl cellulose, and poly(meth)acrylic acid and various esters thereof, derivatives thereof, copolymers thereof, and mixtures thereof. Those films may each be coated with a ceramic material, such as alumina or silica, magnesium oxide, an aramid resin, or polyvinylidene fluoride.

Those films may be used alone or as a multi-layer film in which those films are laminated on each other. Further, various additives may be used in each of those films, and the kind and content thereof are not particularly limited. Of those films, a film consisting of polyethylene, polypropylene, polyvinylidene fluoride, polysulfone, or a mixture thereof is preferably used in a method of manufacturing the secondary battery. When the non-aqueous solvent electrolyte is the pure polymer electrolyte or the inorganic solid electrolyte, the separator may not be incorporated.

A laminate film or a metal container may be used as an exterior member. The thickness of the exterior member is generally 0.5 mm or less, preferably 0.3 mm or less. Examples of the shape of the exterior member include a flat shape (thin shape), a rectangular shape, a cylindrical shape, a coin shape, and a button shape.

A multi-layer film comprising a metal layer between resin films may be used as the laminate film. The metal layer is preferably an aluminum foil or an aluminum alloy foil for weight saving. For example, a polymer material, such as polypropylene, polyethylene, nylon, or polyethylene terephthalate, may be used as the resin film. The laminate film may be sealed through thermal fusion and formed into the shape of the exterior member.

The metal container may be formed of, for example, stainless steel, aluminum, or an aluminum alloy. The aluminum alloy is preferably an alloy containing an element, such as magnesium, zinc, or silicon. When the content of a transition metal, such as iron, copper, nickel, or chromium, in aluminum or the aluminum alloy is set to 1% or less, the long-term reliability and heat dissipation property of the battery under a high-temperature environment can be dramatically improved.

EXAMPLES

Now, the present invention is described in more detail by way of the Examples and the Comparative Examples. However, the present invention is not limited to the Examples and the like below. "Part(s)" and "%" in the Examples are by mass unless otherwise stated. In addition, in the measurement of an average particle diameter, the measurement was performed with a laser diffraction/scattering particle size distribution analyzer (manufactured by HORIBA, Ltd., model: LA-950V2) through use of water as a dispersing medium.

Raw material PAN mixture: 10 parts by mass of polyacrylonitrile powder (manufactured by Sigma-Aldrich, average particle diameter: 200 μm, weight average molecular weight: about 150,000) and 30 parts by mass of sulfur powder (manufactured by Sigma-Aldrich, average particle diameter: 200 μm) were mixed with a mortar, and the mixture was used as a raw material for a sulfur-modified polyacrylonitrile in each of Production Examples 1 to 3.

Example 1

A center portion of a glass tube made of heat-resistant glass having an outer diameter of 10 mm and an inner diameter of 6 mm was heated to be expanded. Thus, a volumetric pipette-type core tube made of glass comprising an expanded portion having an outer diameter of 30 mm and a length of 50 mm in a center portion thereof and thin tubes each having an outer diameter of 10 mm and a length of 150 mm at both ends thereof was produced.

5 g of the raw material PAN mixture was loaded in the expanded portion of the core tube, and the core tube was arranged so as to have an inclination of 5°. After the inside of the core tube was replaced with a nitrogen gas, the raw material PAN mixture was heated at 400° C. for 1 hour while being rotated at 1 rotation per minute. Thus, an intermediate product was obtained. During the heating, a nitrogen gas was fed at a flow rate of 100 ml/min from a lower end of the core tube so that a hydrogen sulfide gas to be generated was able to be discharged from an upper end of the core tube. In addition, while a portion to be heated of the core tube was set to the entirety of the expanded portion, sulfur having sublimated and adhered to a thin tube portion was refluxed to the expanded portion by being appropriately heated to be melted.

The resultant intermediate product was placed in a glass tube oven, and heated at 250° C. for 1 hour while being vacuum suctioned, to thereby remove elemental sulfur therefrom. The resultant sulfur-modified product was pulverized with a ball mill, and coarse particles were then removed therefrom with a sieve having an opening of 40 μm. Thus, a sulfur-modified polyacrylonitrile of Example 1 having an average particle diameter of 10 μm was obtained.

Example 2

The same operations as in Example 1 were performed except that the elemental sulfur removal conditions for the intermediate product in Example 1 were changed from 250° C. for 1 hour to 250° C. for 2 hours. Thus, a sulfur-modified polyacrylonitrile of Example 2 having an average particle diameter of 10 μm was obtained.

Example 3

The same operations as in Example 1 were performed except that the elemental sulfur removal conditions for the intermediate product in Example 1 were changed from 250° C. for 1 hour to 250° C. for 6 hours. Thus, a sulfur-modified polyacrylonitrile of Example 3 having an average particle diameter of 10 μm was obtained.

Comparative Example 1

A sulfur-modified polyacrylonitrile was produced by a method in conformity with the Production Examples of JP 2013-054957 A. Specifically, 20 g of the raw material PAN mixture was loaded in a bottomed cylindrical glass tube having an outer diameter of 45 mm and a length of 120 mm, and a silicone plug comprising a gas introduction tube and a gas discharge tube was then installed in an opening of the glass tube. After the air in the inside of the glass tube was replaced with nitrogen, a lower portion of the glass tube was placed in a crucible-type electric furnace, and heated at 400° C. for 1 hour while hydrogen sulfide to be generated was removed by introducing nitrogen from the gas introduction tube. A sulfur vapor is refluxed by being condensed at an upper portion or a lid portion of the glass tube. After cooling, an intermediate product was placed in a glass tube oven, and heated at 250° C. for 1 hour while being vacuum suctioned, to thereby remove elemental sulfur therefrom. The resultant sulfur-modified product was pulverized with a ball mill, and coarse particles were then removed therefrom with a sieve having an opening of 40 μm. Thus, a sulfur-modified polyacrylonitrile of Comparative Example 1 having an average particle diameter of 10 μm was obtained.

Comparative Example 2

The same operations as in Comparative Example 1 were performed except that the elemental sulfur removal conditions for the intermediate product in Comparative Example 1 were changed from 250° C. for 1 hour to 250° C. for 2 hours. Thus, a sulfur-modified polyacrylonitrile of Comparative Example 2 having an average particle diameter of 10 μm was obtained.

Comparative Example 3

The same operations as in Comparative Example 1 were performed except that the elemental sulfur removal conditions for the intermediate product in Comparative Example 1 were changed from 250° C. for 1 hour to 250° C. for 6 hours. Thus, a sulfur-modified polyacrylonitrile of Comparative Example 3 having an average particle diameter of 10 μm was obtained.

Comparative Example 4

A sulfur-modified polyacrylonitrile was produced by a method in conformity with the Example of JP 2014-022123 A. Specifically, there was used a reactor in which a ribbon-type screw having a shaft diameter of 5 mm and a shaft length of 600 mm, and having a screw diameter of 42 mm, a screw length of 450 mm, and a screw pitch of 30 mm was placed in a glass tube made of heat-resistant glass having an outer diameter of 50 mm, an inner diameter of 45 mm, and a length of 500 mm, silicone rubber plugs each having a hole for a screw at a center portion thereof and having a hole for gas introduction or discharge at a position apart from the center portion were installed on both ends of the glass tube, and further, glass thin tubes each made of heat-resistant glass having an outer diameter of 7 mm, an inner diameter of 5 mm, and a length of 100 mm were installed in the hole for gas introduction or discharge of each of the silicone rubber plugs. The reactor was mounted to a tubular electric furnace comprising a portion to be heated of 300 mm, and the electric furnace was inclined so that the reactor had an inclination of 5°. 30 g of the raw material PAN mixture was loaded from an upper portion of the inclined reactor. After the inside of the reactor was replaced with a nitrogen gas, the temperature of the electric furnace was set to 420° C., and the raw material PAN mixture was heated while being rotated at 0.5 rotation per minute. During the heating, a nitrogen gas was fed at a flow rate of 100 ml/min from the glass thin tube at a lower end of the reactor, and a hydrogen sulfide gas to be generated was discharged from the glass thin tube at an upper end thereof. In addition, sulfur having sublimated and adhered to the glass thin tube at the upper end was refluxed to the expanded portion by being appropriately heated to be melted.

An intermediate product having passed through the portion to be heated of the reactor was subjected to the same operations as in Comparative Example 1 after cooling. Thus, a sulfur-modified polyacrylonitrile of Comparative Example 4 having an average particle diameter of 10 μm was obtained.

Comparative Example 5

The same operations as in Comparative Example 4 were performed except that the elemental sulfur removal conditions for the intermediate product in Comparative Example 4 were changed from 250° C. for 1 hour to 250° C. for 2 hours. Thus, a sulfur-modified polyacrylonitrile of Comparative Example 5 having an average particle diameter of 10 μm was obtained.

Comparative Example 6

The same operations as in Comparative Example 4 were performed except that the elemental sulfur removal conditions for the intermediate product in Comparative Example 4 were changed from 250° C. for 1 hour to 250° C. for 6 hours. Thus, a sulfur-modified polyacrylonitrile of Comparative Example 6 having an average particle diameter of 10 μm was obtained.

[Content of Sulfur]

The content of sulfur was calculated from the analysis results of analysis of each of sulfur-modified polyacrylonitriles of Examples 1 to 3 and Comparative Examples 1 to 6 with a CHN analyzer (manufactured by Elementar Analysensysteme GmbH, model: varioMICROcube) capable of analyzing sulfur and oxygen.

TABLE 1

|  | Content of sulfur (mass %) |
| --- | --- |
| Example 1 | 42.9 |
| Example 2 | 38.8 |
| Example 3 | 37.2 |
| Comparative Example 1 | 42.3 |
| Comparative Example 2 | 38.1 |
| Comparative Example 3 | 37.3 |
| Comparative Example 4 | 42.2 |
| Comparative Example 5 | 36.9 |
| Comparative Example 6 | 36.3 |

[Production of Electrode]

Electrodes of Examples 4 to 6 and Comparative Examples 7 to 12 were produced by the following method through use of the sulfur-modified polyacrylonitriles of Examples 1 to 3 and Comparative Examples 1 to 6, respectively.

92.0 Parts by mass of the sulfur-modified polyacrylonitrile serving as an electrode active material, 3.5 parts by mass of acetylene black (manufactured by Denka Company Limited) and 1.5 parts by mass of a carbon nanotube (manufactured by Showa Denko K.K., product name: VGCF) serving as conductive assistants, 1.5 parts by mass of a styrene-butadiene rubber (aqueous dispersion, manufactured by Zeon Corporation) and 1.5 parts by mass of carboxymethyl cellulose (manufactured by Daicel Fine Chem Ltd.) serving as binders, and 120 parts by mass of water serving as a solvent were mixed with each other with a rotation/revolution mixer to prepare a slurry. The slurry composition was applied onto a current collector formed of stainless-steel foil (thickness: 20 μm) by a doctor blade method and dried at 90° C. for 3 hours. After that, the electrode was cut into a predetermined size and subjected to vacuum drying at 120° C. for 2 hours. Thus, a disc-shaped electrode was produced.

[Production of Positive Electrode 1]

90.0 Parts by mass of $Li(Ni_{1/3}Co_{1/3}Mn_{1/3})O_2$ (manufactured by Nihon Kagaku Sangyo Co., Ltd., product name: NCM 111, hereinafter referred to as "NCM") serving as a positive electrode active material, 5.0 parts by mass of acetylene black (manufactured by Denka Company Limited) serving as a conductive assistant, and 5.0 parts by mass of polyvinylidene fluoride (manufactured by Kureha Corporation) serving as a binder were mixed and dispersed in 100 parts by mass of N-methylpyrrolidone with a rotation/revolution mixer to prepare a slurry. The slurry composition was applied onto a current collector formed of aluminum foil (thickness: 20 μm) by a doctor blade method and dried at 90° C. for 3 hours. After that, the electrode was cut into a predetermined size and subjected to vacuum drying at 120° C. for 2 hours. Thus, a disc-shaped positive electrode 1 was produced.

[Production of Negative Electrode 1]

Metal lithium having a thickness of 500 μm was cut into a predetermined size. Thus, a disc-shaped negative electrode 1 was produced.

[Preparation of Non-Aqueous Electrolyte]

An electrolyte solution was prepared by dissolving $LiPF_6$ at a concentration of 1.0 mol/L in a mixed solvent consisting of 50 vol % of ethylene carbonate and 50 vol % of diethyl carbonate.

[Assembly of Battery]

Each of the electrodes of Examples 4 to 6 and Comparative Examples 7 to 12 serving as a positive electrode and the negative electrode 1 serving as a negative electrode were held in a case while a glass filter serving as a separator was sandwiched therebetween. After that, the non-aqueous electrolyte prepared in advance was injected into the case, and the case was hermetically sealed. Thus, a non-aqueous electrolyte secondary battery (a coin-shaped battery having a diameter of φ20 mm and a thickness of 3.2 mm) of each of Examples 7 to 9 and Comparative Examples 13 to 18 was produced. In addition, the positive electrode 1 serving as a positive electrode and each of the electrodes of Examples 4 to 6 and Comparative Examples 7 to 12 serving as a negative electrode were held in a case while a glass filter serving as a separator was sandwiched therebetween. After that, the non-aqueous electrolyte prepared in advance was injected into the case, and the case was hermetically sealed. Thus, a non-aqueous electrolyte secondary battery (a coin-shaped battery having a diameter of φ20 mm and a thickness of 3.2 mm) of each of Examples 10 to 12 and Comparative Examples 19 to 24 was produced.

[Charge-discharge Test Method]

The non-aqueous electrolyte secondary battery was placed in a constant-temperature bath at 30° C., and subjected to a total of 10 cycles of charging and discharging in which a charge final voltage and a discharge final voltage were set to 3.0 V and 1.0 V, respectively, that is, 5 cycles of charging and discharging at a charge rate of 0.1 C and a discharge rate of 0.1 C and then 5 cycles of charging and discharging at a charge rate of 0.1 C and a discharge rate of 2 C. The charge capacity and the discharge capacity (unit: mAh/g) were measured at each cycle, and a ratio of the discharge capacity at the tenth cycle to the discharge capacity at the fifth cycle was used as a capacity retention rate (%). A higher capacity retention rate in this test indicates more excellent rate characteristics because the discharge rate in this test is 0.1 C from the first cycle to the fifth cycle and 2 C from the sixth cycle to the tenth cycle. The results of Examples 7 to 9 and Comparative Examples 13 to 18 are shown in Table 2, and the results of Examples 10 to 12 and Comparative Examples 19 to 24 are shown in Table 3.

TABLE 2

| | Positive electrode (electrode active material) | Negative electrode | Discharge capacity (mAh/g) | Capacity retention rate (%) |
|---|---|---|---|---|
| Example 7 | Example 4 (Example 1) | Negative electrode 1 | 604 | 81 |
| Example 8 | Example 5 (Example 2) | Negative electrode 1 | 552 | 81 |
| Example 9 | Example 6 (Example 3) | Negative electrode 1 | 526 | 82 |
| Comparative Example 13 | Comparative Example 7 (Comparative Example 1) | Negative electrode 1 | 590 | 73 |
| Comparative Example 14 | Comparative Example 8 (Comparative Example 2) | Negative electrode 1 | 538 | 72 |
| Comparative Example 15 | Comparative Example 9 (Comparative Example 3) | Negative electrode 1 | 520 | 71 |
| Comparative Example 16 | Comparative Example 10 (Comparative Example 4) | Negative electrode 1 | 596 | 77 |
| Comparative Example 17 | Comparative Example 11 (Comparative Example 5) | Negative electrode 1 | 535 | 72 |
| Comparative Example 18 | Comparative Example 12 (Comparative Example 6) | Negative electrode 1 | 510 | 78 |

TABLE 3

| | Positive electrode (positive electrode active material) | Negative electrode (electrode active material) | Discharge capacity (mAh/g) | Capacity retention rate (%) |
|---|---|---|---|---|
| Example 10 | Positive electrode 1 (NCM) | Example 4 (Example 1) | 602 | 82 |
| Example 11 | Positive electrode 1 (NCM) | Example 5 (Example 2) | 550 | 83 |
| Example 12 | Positive electrode 1 (NCM) | Example 6 (Example 3) | 524 | 83 |
| Comparative Example 19 | Positive electrode 1 (NCM) | Comparative Example 7 (Comparative Example 1) | 593 | 73 |
| Comparative Example 20 | Positive electrode 1 (NCM) | Comparative Example 8 (Comparative Example 2) | 536 | 74 |
| Comparative Example 21 | Positive electrode 1 (NCM) | Comparative Example 9 (Comparative Example 3) | 525 | 72 |
| Comparative Example 22 | Positive electrode 1 (NCM) | Comparative Example 10 (Comparative Example 4) | 595 | 77 |
| Comparative Example 23 | Positive electrode 1 (NCM) | Comparative Example 11 (Comparative Example 5) | 538 | 73 |
| Comparative Example 24 | Positive electrode 1 (NCM) | Comparative Example 12 (Comparative Example 6) | 507 | 79 |

It is found that each of secondary batteries of Examples 7 to 12, in which the sulfur-modified polyacrylonitriles of Examples 1 to 3 produced by subjecting polyacrylonitrile and sulfur to heat treatment in the rotating-type heating container are used, has a higher capacity retention rate and is more excellent in discharge rate than each of the secondary batteries of Comparative Examples 13 to 24, in which the sulfur-modified polyacrylonitriles of Comparative Examples 1 to 3 in which the raw materials are not mixed with each other during the heat treatment and the sulfur-modified polyacrylonitriles of Comparative Examples 4 to 6 in which the raw materials are mixed with each other with a screw are used.

[Production of Electrode]

A slurry obtained by mixing the sulfur-modified polyacrylonitrile of Example 2 or Comparative Example 2 or 5, or NCM serving as an electrode active material, acetylene black (manufactured by Denka Company Limited, hereinafter referred to as "AB") serving as a conductive assistant, a polyacrylic binder (hereinafter referred to as "ACB") serving as a binder, and water serving as a solvent with a rotation/revolution mixer so as to give a composition shown in Table 4 was applied onto a current collector by a doctor blade method, and dried at 90° C. for 3 hours. After that, the resultant electrode was cut into a predetermined size, and dried in vacuum at 120° C. for 2 hours. Thus, a disc-shaped electrode was produced. Carbon-coated aluminum foil and aluminum foil were used as the current collectors in the cases of the sulfur-modified polyacrylonitriles and NCM, respectively.

[Assembly of Battery]

The positive electrode of each of Examples 13 to 16 and Comparative Examples 25 to 36 and the disc-shaped negative electrode obtained by cutting metal lithium having a thickness of 500 μm into a predetermined size were held in a case while a glass filter serving as a separator was sandwiched therebetween. After that, the non-aqueous electrolyte prepared in advance was injected into the case, and the case was hermetically sealed. Thus, a non-aqueous electrolyte secondary battery (a coin-shaped battery having a diameter of φ20 mm and a thickness of 3.2 mm) was produced. The positive electrode of each of Comparative Examples 35 and 36 had an insufficient binding property of its electrode active material mixture layer, and a battery could not be produced. As a result, a charge-discharge test was not performed.

[Charge-Discharge Test Method]

The non-aqueous electrolyte secondary battery was placed in a constant-temperature bath at 30° C., and subjected to 5 cycles of charging and discharging at a charge rate of 0.1 C and a discharge rate of 0.1 C in which a charge final voltage and a discharge final voltage were set to 3.0 V and 1.0 V, respectively, in each of the batteries of Examples 13 to 16 and Comparative Examples 25 to 32, in which the sulfur-modified polyacrylonitrile was used as the electrode active material, and were set to 4.2 V and 3.0 V, respectively, in each of the batteries of Comparative Examples 33 and 34, in which NCM was used as the electrode active material. A discharge capacity A, which is a discharge capacity per mass of the electrode active material, and a discharge capacity B, which is a discharge capacity per mass of the electrode active material mixture layer, at the fifth cycle are shown in Table 4.

TABLE 4

| | Electrode active material | Conductive assistant | Binder | Discharge capacity A (mAh/g) | Discharge capacity B (mAh/g) |
|---|---|---|---|---|---|
| Example 13 | Example 2 (94.0) | AB (3.0) | ACB (3.0) | 544 | 511 |
| Example 14 | Example 2 (96.1) | AB (3.0) | ACB (0.9) | 545 | 524 |
| Example 15 | Example 2 (96.6) | AB (3.0) | ACB (0.4) | 544 | 526 |
| Example 16 | Example 2 (96.9) | AB (3.0) | ACB (0.1) | 544 | 527 |
| Comparative Example 25 | Comparative Example 2 (94.0) | AB (3.0) | ACB (3.0) | 543 | 510 |
| Comparative Example 26 | Comparative Example 2 (96.1) | AB (3.0) | ACB (0.9) | 542 | 521 |
| Comparative Example 27 | Comparative Example 2 (96.6) | AB (3.0) | ACB (0.4) | 539 | 521 |
| Comparative Example 28 | Comparative Example 2 (96.9) | AB (3.0) | ACB (0.1) | 528 | 512 |
| Comparative Example 29 | Comparative Example 5 (94.0) | AB (3.0) | ACB (3.0) | 543 | 510 |
| Comparative Example 30 | Comparative Example 5 (96.1) | AB (3.0) | ACB (0.9) | 542 | 521 |
| Comparative Example 31 | Comparative Example 5 (96.6) | AB (3.0) | ACB (0.4) | 542 | 524 |
| Comparative Example 32 | Comparative Example 5 (96.9) | AB (3.0) | ACB (0.1) | 531 | 515 |
| Comparative Example 33 | NCM (94.0) | AB (3.0) | ACB (3.0) | 146 | 137 |
| Comparative Example 34 | NCM (96.1) | AB (3.0) | ACB (0.9) | 122 | 117 |
| Comparative Example 35 | NCM (96.4) | AB (3.0) | ACB (0.4) | — | — |
| Comparative Example 36 | NCM (96.9) | AB (3.0) | ACB (0.1) | — | — |

From the test results of Examples 13 to 16, Comparative Examples 25 to 32, and Comparative Examples 33 and 34, the discharge capacity B, which is a discharge capacity per mass of the electrode active material mixture layer, is higher in the case of the sulfur-modified polyacrylonitrile than in the case of NCM even when the amount of the binder is reduced. This indicates that, even when the amount of the binder is reduced, a satisfactory electrode active material mixture layer is formed, and a charge-discharge capacity per volume of the electrode can be increased. Among the sulfur-modified polyacrylonitriles, the sulfur-modified polyacrylonitrile of Example 2, which is produced by subjecting polyacrylonitrile and sulfur to heat treatment in the rotating-type heating container, provides a higher discharge capacity B.

REFERENCE SIGNS LIST 10, 20, 30: rotating-type heating container
1: rotating-type heating unit
2: sulfur recovery unit
3: temperature controller
4: discharge pipe
5: gas introduction pipe
6: gas introduction port
7: discharge port

The invention claimed is:

1. A method of producing sulfur-modified polyacrylonitrile, comprising:
   a step (1) of heating polyacrylonitrile and elemental sulfur in a rotating-type heating container comprising a discharge pipe and a sulfur vapor recovery unit while rotating the rotating-type heating container;
   a step (2) of liquefying a sulfur vapor by the sulfur vapor recovery unit while discharging hydrogen sulfide generated in the heating step; and
   a step (3) of returning the liquefied sulfur to a mixture of the sulfur and the polyacrylonitrile of the step (1).

2. The method of producing sulfur-modified polyacrylonitrile according to claim 1, wherein a ratio between the polyacrylonitrile and the elemental sulfur is as follows: 100 parts by mass to 1,500 parts by mass of the elemental sulfur with respect to 100 parts by mass of the polyacrylonitrile.

3. The method of producing sulfur-modified polyacrylonitrile according to claim 1, wherein the polyacrylonitrile and the elemental sulfur each have a particle diameter of from 1 μm to 1,000 μm in terms of an average particle diameter.

4. The method of producing sulfur-modified polyacrylonitrile according to claim 1, wherein the polyacrylonitrile and the elemental sulfur each have a particle diameter of from 1 μm to 1,000 μm in terms of an average particle diameter.

* * * * *